United States Patent [19]

Fretwell, Jr.

[11] 4,370,783

[45] Feb. 1, 1983

[54] YIELDABLE LOAD RELEASE CONNECTOR

[76] Inventor: Jack W. Fretwell, Jr., 13354 Feldman Pl., Herndon, Va. 22070

[21] Appl. No.: 216,011

[22] Filed: Dec. 11, 1980

Related U.S. Application Data

[63] Continuation of Ser. No. 940,289, Sep. 7, 1978, abandoned.

[51] Int. Cl.³ .............................................. F16G 11/00
[52] U.S. Cl. ............................... 24/201 TR; 24/115 F
[58] Field of Search .......... 24/201 TR, 201 R, 201 L, 24/115 F, 115 R, 237; 267/73; 403/2; 70/457–459; 280/193; 248/548

[56] References Cited

U.S. PATENT DOCUMENTS

| | | | |
|---|---|---|---|
| 1,752,619 | 4/1930 | Summerfeld | 24/201 TR |
| 2,370,232 | 2/1945 | Creekbaum | 24/201 TR X |
| 3,046,929 | 7/1962 | Piver | 24/115 R X |
| 3,766,681 | 10/1973 | Mander | 24/201 TR X |
| 3,825,092 | 7/1974 | Graydon et al. | 24/201 TR X |
| 3,890,800 | 6/1975 | Montague | 24/201 TR X |

FOREIGN PATENT DOCUMENTS

| | | | |
|---|---|---|---|
| 1293230 | 4/1962 | France | 70/458 |
| 241414 | 10/1925 | United Kingdom | 70/457 |

*Primary Examiner*—Philip C. Kannan

[57] ABSTRACT

Yieldable load release connector comprising a coil of resilient plastic rod extending for 400° to 800° and having two free ends, and fastening means attached to the coil at a point spaced substantially equidistant from each said end for fastening said coil to a first object and the coil encircles a second object thereby connecting the two.

4 Claims, 3 Drawing Figures

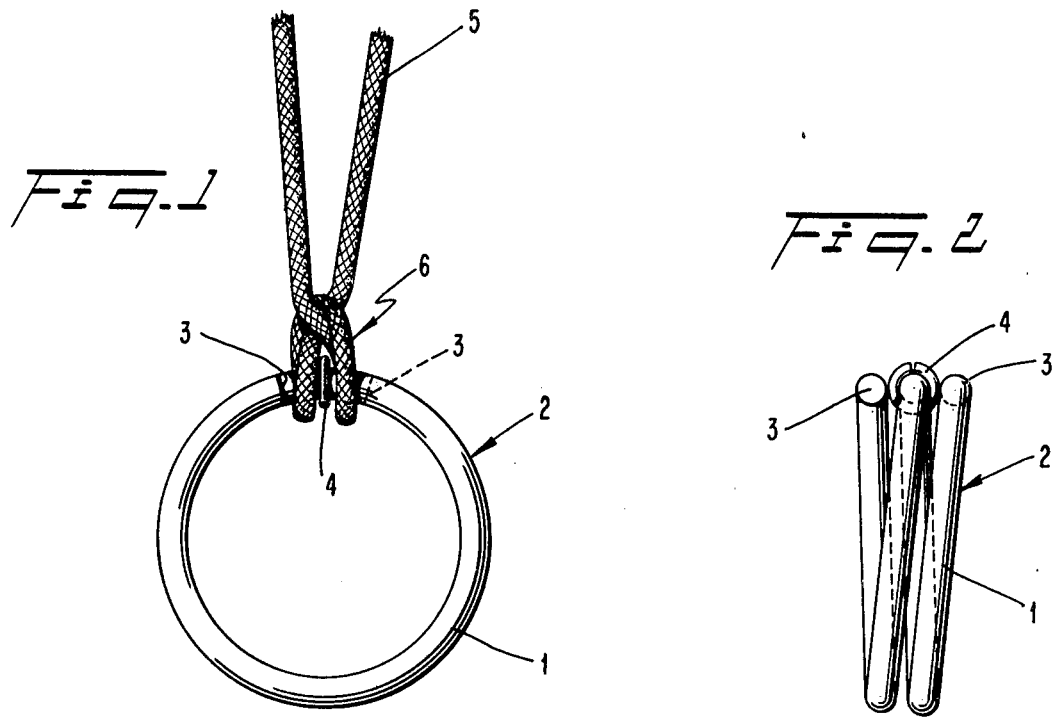
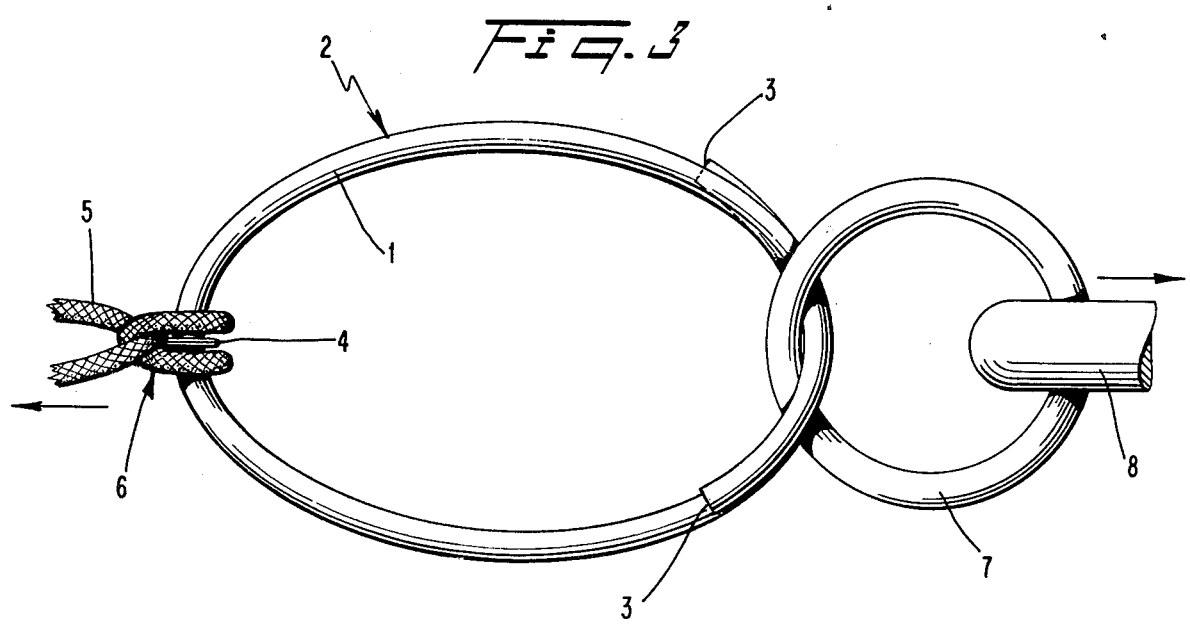

YIELDABLE LOAD RELEASE CONNECTOR

This is a continuation of application Ser. No. 940,289, filed Sept. 7, 1978, now abandoned.

BACKGROUND OF THE INVENTION

The present invention relates to load release connectors for connecting two objects and providing for quick release of the objects by application of a sufficient separating force.

Load release connectors are desirable to connect two objects in such a way that upon application of a sufficiently great separating force the objects can be separated before either object or the connector is damaged by the separating force.

An example of the need for load release connectors is in the connection of control lines between two vehicles such as a farm tractor and an implement it is pulling such that functions of the implement can be remotely controlled by the tractor operator from the driver's seat. The load release feature of the connector is desirable to avoid damage in the event the implement is unhitched from the tractor and the tractor is driven off without disconnecting the control line connector. U.S. Pat. No. 1,752,619 discloses a load release connector intended to avoid damage due to forgetfulness to disconnect control lines between a tractor and an implement it is towing. While, under ideal conditions, the connector described in this patent is capable of performing satisfactorily, the application of momentary or short-lived loads, as a consequence of the control line being struck by an object such as a piece of dirt, a stone or a branch or as a result of a sudden change in the terrain being traveled, cause disconnection of the control line and loss of control over the implement functions. The connector of this patent fails to provide the "give" necessary to accommodate momentary loads or loads of short duration and in this regard is unable to yield to such momentary loads without disconnecting.

Another example of the need for load release connectors is on sailing vessels wherein a sail such as a spinnaker in stored in-ready condition for launching must be tied down to prevent loss, premature launching or entanglement because of heaving, rolling, pitching and/or yawing movements of the vessel. When manual release connectors, which do not release upon application of a load, are used there is the danger of damage to the sail and/or tie down equipment, when because of forgetfulness, the sail is launched before the connector is released. Load release connectors, heretofore known, are not able to solve the problem because momentary loads, i.e., loads of short duration, such as are caused by the rolling, pitching and/or yawing movements of the sailing vessel or by wind conditions, can cause premature disconnection which can be hazardous to the vessel or its equipment or its passengers.

SUMMARY OF THE INVENTION

The present invention provides a yieldable, load release connector which is capable of remaining connected even when loads of short duration are applied but which can be quickly disconnected at will or as a result of forgetfulness when a sufficient sustained load is applied. The load release connector of this invention permits the objects connected by it to move further apart under a load so as to allow easing of the load without disconnection, and, upon easing of the load, urges the objects back to their initial relative positions. This permits relative movement of the objects without damaging them and without resulting in accidental disconnection. In effect, the connector of this invention exerts a braking action on those loads that tend to cause disconnection and prevents the build-up loads such as momentum which if unchecked would cause disconnection.

BRIEF DESCRIPTION OF THE DRAWINGS

FIG. 1 is a plan view of one embodiment of the invention;

FIG. 2 is an elevational view of the embodiment shown in FIG. 1 omitting, however, the piece of line employed as a fastening means; and FIG. 3 is a plan view of the embodiment shown in FIG. 1 showing the connector attached to a ring and a separating force applied to expand the connector without causing disconnection.

DETAILED DESCRIPTION OF THE INVENTION

Referring to the drawing a resilient polyurethane rod 1 is shaped in the form of a relatively tight coil 2 terminating in ends 3 that are spaced apart from each other. The coil 2 extends almost 720°. A split metal ring 4 is clamped to the rod 1 at a point approximately midway between its ends 3 such that said split ring is spaced from said ends a sufficient distance to permit clearance for a piece of line 5 which is wrapped around the rod 1 on both sides of the split ring 4 and secured to the rod by a suitable knot 6. The split ring 4 functions to retain the line 5 from splipping along rod 1. For simplicity of illustration, the line 5 is not shown in FIG. 2.

The plastic rod 1 which is formed into coil 2 is made of a resilient material having a plastic memory which urges it to return to its coil form upon application of forces tending to straighten it from its coil shape. It also has a relatively high fatigue strength enabling it to be flexed repeatedly by the repeated application and release of forces tending to straighten it from its coil shape without substantial loss of its resiliency or plastic memory. There are many plastics available that are able to provide the desired resiliency, plastic memory and fatigue strength including polypropylene and polyurethane resins which are preferred. One example of a suitable polyurethane resin is made from tolylene diisocyanate, a polyether and a curative such as 4,4'-methylene bis (2-chloroaniline). Other suitable polyurethane resins are available. Also suitable are metals alloyed to provide the desired degree of resiliency, plastic memory and fatigue strength.

The resilient force urging the plastic rod back into coil shape after application and release of straightening forces can be increased by increasing the cross-sectional area, e.g., thickness, of the rod or by changing the material from which it is made to a more resilient material or, to some extent, by decreasing the inside diameter of the coil.

In addition, the split ring 4 and piece of line 5 can be replaced by any other suitable fastening means. For example, a hole can be drilled through the rod 1 and an eye can be inserted into the hole and bolted to the rod. Alternatively, a split ring having an eye integrally attached to it can be clamped on the rod. Any suitable fastening means can be secured to the rod 1 in any suitable way as a replacement for the split ring 4 and line 5.

FIG. 3 illustrates the load release connector depicted in FIGS. 1 and 2 in operation connecting a solid ring 7 which in turn is connected by a rope 8 to an object (not shown). The line 5 is tied to another object. Diametrically opposed forces are applied to the objects in the direction of the arrows shown. The rod 1 is shown extended from its original coiled or helical shape to form an oblong shape in which the ends 3 are further away from the split ring 4 and piece of line 5. The resiliency and plastic memory of the rod 1 in the oblong shape shown exert counter forces on the objects to resist their further separation, thus effecting a braking action on the movement of the objects away from each other. The connector will not release until the ends 3 pass each other on each side of the solid ring 7 and allow it to pass between the ends 3.

The yieldable, load release connector of this invention can be used in any situation where it is desired to connect two objects and to allow quick release or disconnection of the objects. It finds use in connecting control devices between two vehicles such as a tractor and implement being towed by it. The connector of this invention finds extensive use on sailing vessels for many purposes. It can be used to releasably secure the corners of a spinnaker to a bag or other container in which it is stored preparatory to launching it. The bag or container is lashed or otherwise secured to the deck in position for launching and it is desirable to retain by connectors the spinnaker corners in a readily accessible position to facilitate attachment to the halyard and other rigging when the time comes to hoist the spinnaker. The use of other than load release connectors presents the danger of forgetting to disconnect and of sustaining damage when the spinnaker is hoisted.

The novel connectors can also be used as yieldable, load release sail ties, as halyard or sheet locators or retainers, as coiled line organizers, as dock line hangers to permit easy retrieval when entering slips, as means for mounting life (flotation) rings, overboard poles, boathooks, flashlights, fire extinguishers, etc.

Modifications can be made to the connector as shown and described herein. For example, the fastening means can be located at a point other than the mid-point between the ends, i.e., it can be located at a point which is closer to one end than the other. As shown and described in the drawing, the coil extends for slightly less than 720° leaving a gap between the ends as shown in FIG. 2. This is preferred because application of the second object, such as a line, is simplified by inserting the line between the loops of the coil and applying a twisting action to cause the line to pass the ends of the coil and become disposed within the coil. However, the coil can extend for as low as about 400° and can extend much more than about 720°; e.g., it can extend about 400° to about 800° preferably from about 540° to about 720°. The load required to disconnect is also determined by the number of turns or loops in the coil. Thus a 720° coil requires more load to disconnect than a 400° coil. It can be advantageous also to provide for spacing between the turns or loops of the coil to facilitate the connection of the coil to the second object, e.g., a line.

What is claimed is:

1. Load release connector for connecting a first and a second object comprising a coil of resilient plastic rod extending for at least about 540° and having two free ends, and fastening means attached to said coil at a point spaced substantially equidistant from each said end for fastening said coil to said first object, said coil encircling said second object thereby connecting said two objects, said resilient plastic rod having a plastic memory enabling it to return to its coil form after application and release of forces tending to straighten it and having high fatigue strength enabling it to be flexed repeatedly by said straightening forces without substantial loss of said plastic memory, said coil of resilient plastic rod being extended from its coil shape into an oblong shape and said free ends being further from said fastening means when forces are applied causing said first and second objects to move away from each other, said second object being released when said coil of resilient plastic rod is extended sufficiently far that the ends thereof separate to permit said second object to pass therebetween, said resilient plastic rod while extended into said oblong shape resisting further moving away from each other of said first and second objects and urging said objects toward each other.

2. Connector as claimed in claim 1 wherein said coil is made of polyurethane.

3. Connector as claimed in claim 2 wherein said plastic rod is of a length that extends 720° in said coil.

4. Connector as claimed in claim 2 wherein said fastening means comprises a metal ring clamped to the plastic rod of said coil and a piece of line wrapped around said plastic rod on each side of said ring and secured by a knot.

* * * * *